United States Patent [19]

Gordon

[11] 4,231,471
[45] Nov. 4, 1980

[54] CONVEYOR SKIRTBOARD APRON

[76] Inventor: James R. Gordon, 301 W. Boling, Benton, Ill. 62812

[21] Appl. No.: 29,684

[22] Filed: Apr. 13, 1979

[51] Int. Cl.³ .............................................. B65G 21/20
[52] U.S. Cl. ..................................................... 198/836
[58] Field of Search ................................ 198/836, 525

[56] References Cited

U.S. PATENT DOCUMENTS

| 2,593,610 | 4/1952 | Roberts | 198/836 X |
| 3,024,893 | 3/1962 | Lambert | 198/836 |
| 3,399,466 | 9/1968 | Hartley | 198/836 X |
| 3,499,523 | 3/1970 | Clegg | 198/836 |

FOREIGN PATENT DOCUMENTS

| 2257503 | 5/1973 | Fed. Rep. of Germany | 198/836 |
| 2418458 | 10/1975 | Fed. Rep. of Germany | 198/836 |

*Primary Examiner*—James L. Rowland
*Attorney, Agent, or Firm*—Kinzer, Plyer, Dorn & McEachran

[57] ABSTRACT

A belt conveyor skirtboard apron assembly comprising at least two vertically oriented U-shaped brackets mounted at spaced positions on the skirtboard, preferably inclined inwardly toward the edge of the conveyor belt, a corresponding number of tension arms each mounted in one of the brackets by a wedge that extends through the bracket sidewalls and the tension arm, an apron-mounting channel extending between and affixed to the lower end of each tension arm, and a resilient, flexible apron replaceably mounted on the channel by means of two mounting strips affixed to the apron and slidably fitted into the channel; the vertical position of the apron is adjusted to compensate for wear, without requiring shutdown of the conveyor, by driving the wedges further into the brackets.

8 Claims, 10 Drawing Figures

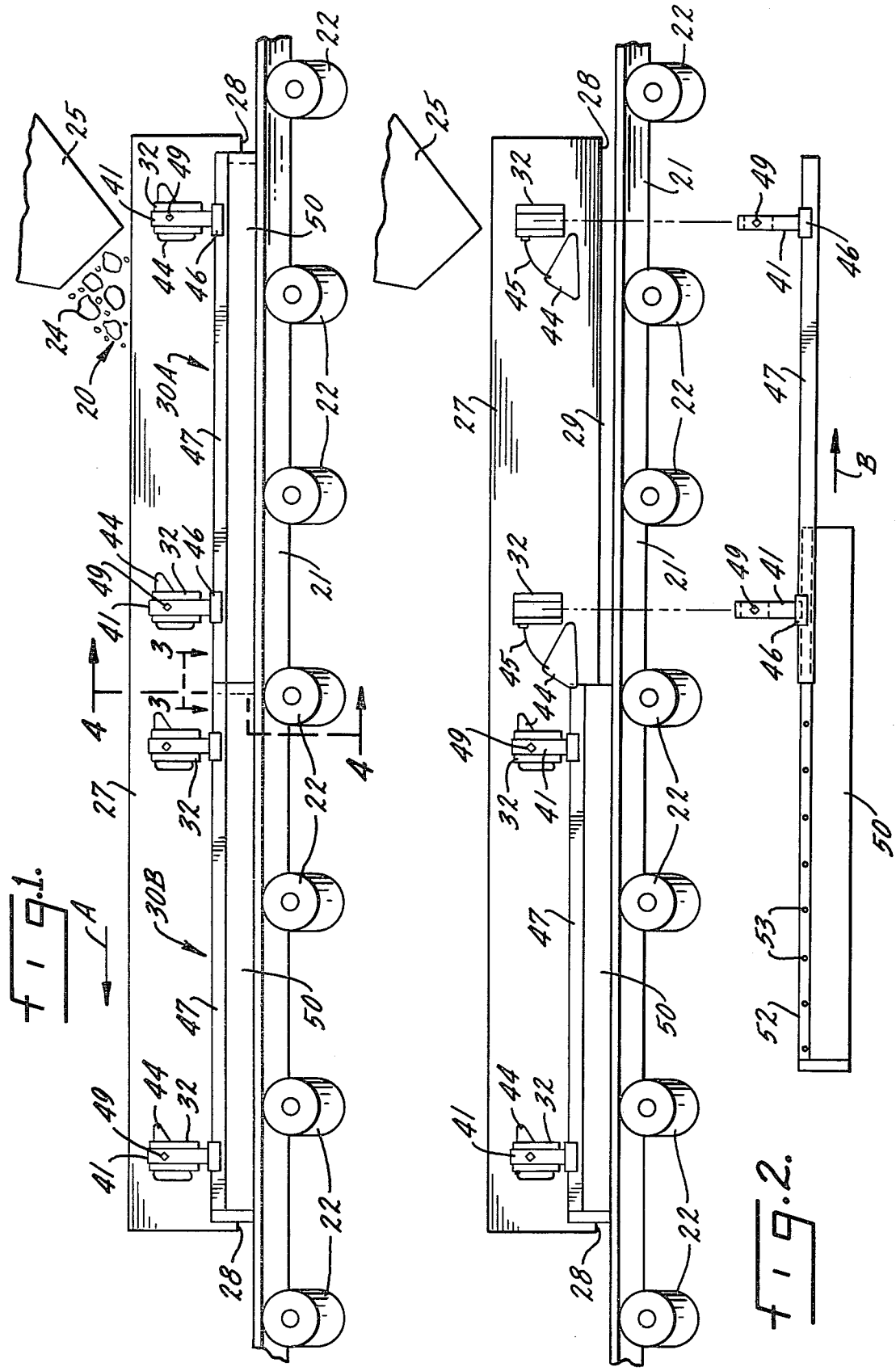

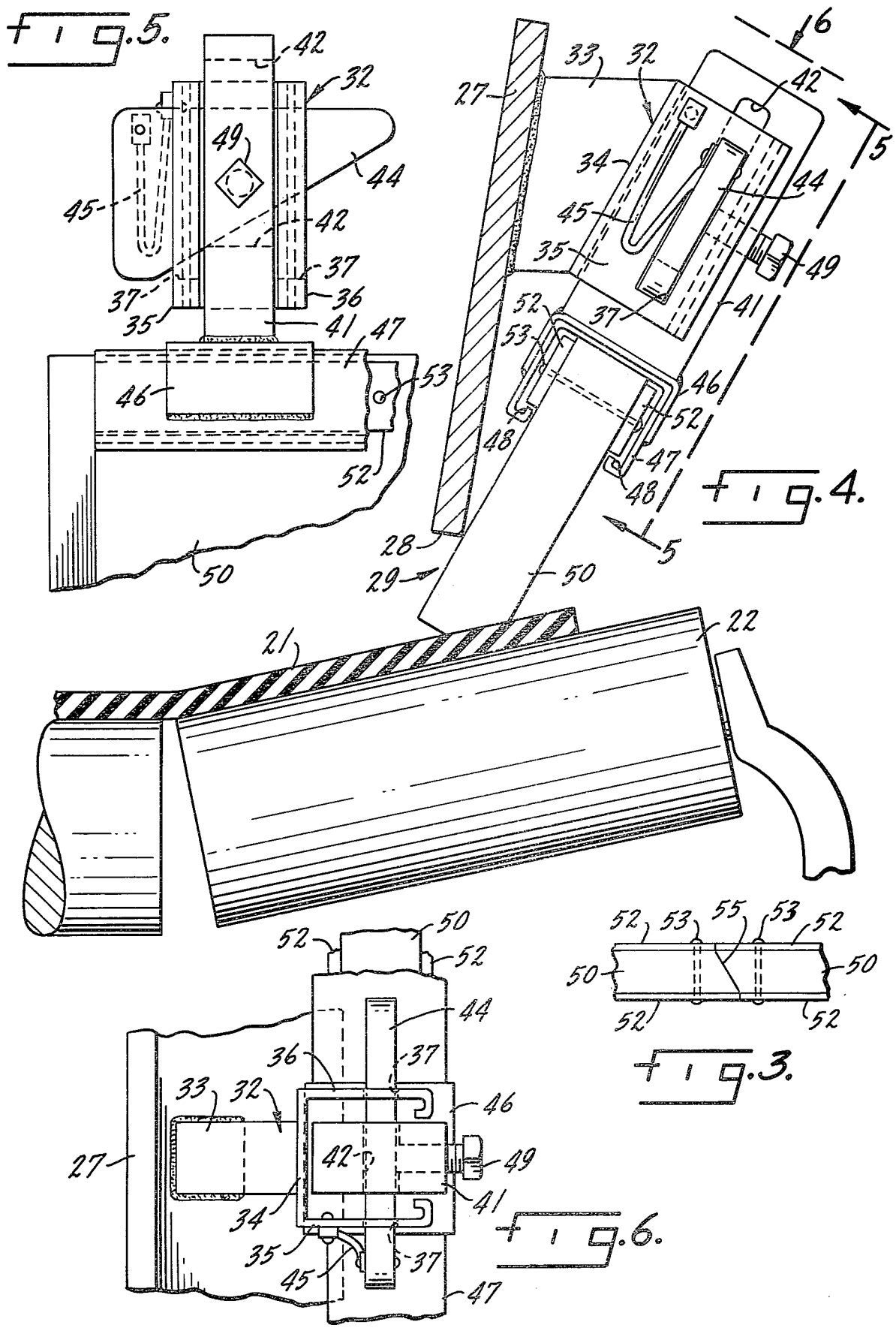

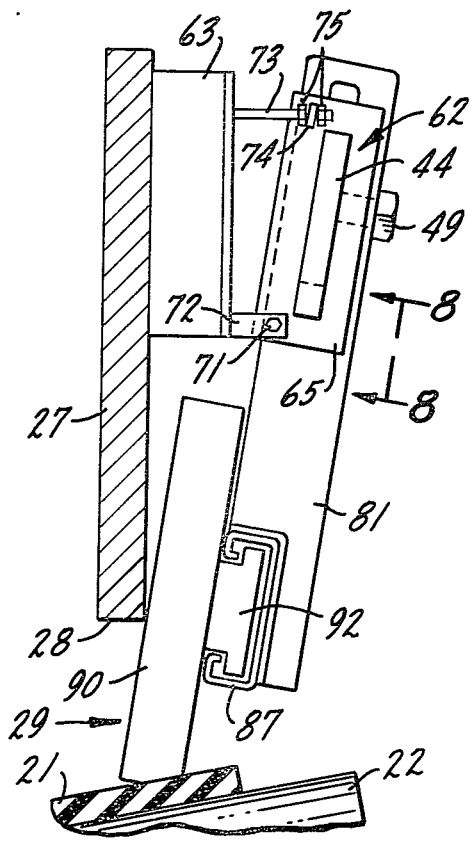
fig. 7.
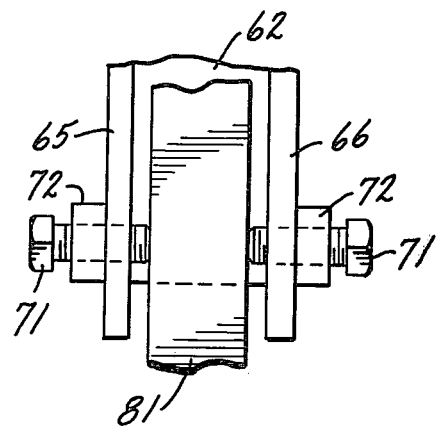
fig. 8.
fig. 9.
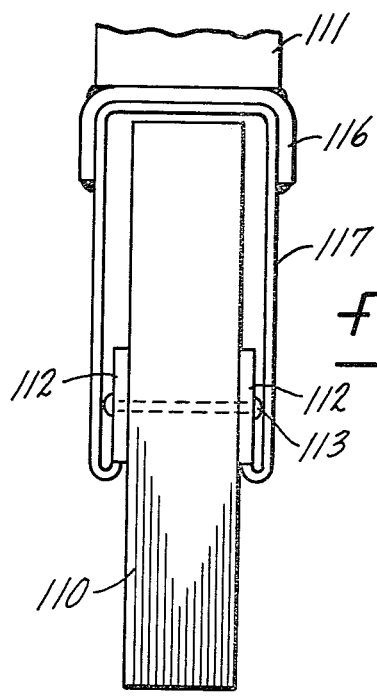
fig. 10.

CONVEYOR SKIRTBOARD APRON

BACKGROUND OF THE INVENTION

At the input station of an endless belt conveyor used for transporting coal, ores, sand or gravel, or other granular material, spillage of material over the edges of the belt can frequently present a substantial problem. The spillage is usually controlled by positioning skirtboards along the edges of the conveyor belt for some distance downstream of the input location. Because the edges of rigid skirtboards engaging the belt edges could create undue friction and cause excessive wear on the belt, as well as undue loading of the conveyor drive, it has been conventional practice to position each skirtboard a short distance above the edges of the belt and to mount a flexible apron on the skirtboard to close the resulting gap. Some prior art systems have provided for vertical adjustment of the aprons to compensate for wear on their lower edges; skirtboards equipped with vertically adjustable aprons of rubber, canvas, or other resilient material are described in Roberts U.S. Pat. No. 2,593,610 issued Apr. 22, 1952 and in Clegg U.S. Pat. No. 3,499,523 issued Mar. 10, 1970.

While these previously known skirtboard and apron arrangements can provide effective control of spillage at the input station of the conveyor, some difficult problems remain. Thus, when continued wear on the lower edge of the apron requires a downward adjustment, the previously known systems have required that the conveyor be shut down. Such a shutdown is highly undesirable, particularly in a high volume conveyor system. Another difficulty with conventional skirtboard apron arrangements is encountered when wear on the apron reaches a stage such that apron replacement becomes necessary. Known systems have usually used a substantial number of bolts or similar fasteners that must be released before the apron can be removed and replaced, unduly extending the conveyor down time required for replacement. In installations where long skirtboards are necessary, the vertical orientation usually used for the aprons may produce excessive friction on the belt, particularly following replacement of the apron or downward adjustment of the apron for wear compensation, with a resulting possibility of damage to the edges of the belts, damage to the conveyor drive, or both.

SUMMARY OF THE INVENTION

It is a principal object of the present invention, therefore, to provide a new and improved skirtboard apron assembly for a belt conveyor that can be readily adjusted to compensate for wear on the apron while the conveyor is maintained in operation.

Another object of the invention is to provide a new and improved skirtboard apron assembly for a belt conveyor that allows for rapid, convenient replacement of the apron.

Another object of the invention is to provide a new and improved skirtboard apron assembly for a belt conveyor that effectively minimizes the friction between the apron and conveyor when the apron is adjusted to a position in which it engages the conveyor belt.

A further object of the invention is to provide a new and improved skirtboard assembly for a belt conveyor that is simple and inexpensive in construction and that provides maximum life for the apron and the conveyor belt.

Accordingly, the invention relates to a skirtboard apron assembly for a belt conveyor for granular material of the kind comprising a rigid skirtboard positioned a short distance above the conveyor belt and a resilient, replaceable apron mounted on and extending downwardly from the skirtboard to close the gap between the skirtboard and the belt. The apron assembly, in assembled condition, completes a plurality of U-shaped brackets mounted at spaced positions along the skirtboard, each bracket having a base and two side walls defining a generally vertically oriented receptacle, the bracket side walls including aligned wedge-receiving apertures; there are a corresponding plurality of tension arms, each positioned in one of the bracket receptacles and each including a wedge-receiving aperture aligned with the wedge-receiving apertures in the bracket sidewalls, each tension arm being affixed to a horizontally oriented apron-mounting channel extending parallel to the conveyor belt surface. A corresponding plurality of wedges are each inserted through the wedge-receiving apertures in one mounting bracket and in one tension arm to mount that tension arm in the bracket. The assembly further comprises an apron having a longitudinally extending mounting element affixed thereto, the mounting element being slidably fitted into the channel of each tension member to suspend the apron from the tension member; the vertical position of the apron is determined by the extent to which the wedges are inserted into the mounting brackets.

BRIEF DESCRIPTION OF THE DRAWINGS

FIG. 1 is a side elevation view of the input location for a belt conveyor for granular material, illustrating a pair of skirtboard apron assemblies constructed in accordance with one embodiment of the present invention;

FIG. 2 is a side elevation view similar to FIG. 1 but showing a subassembly of one of the skirtboard assemblies removed for replacement of the apron;

FIG. 3 is a detailed view taken approximately as indicated by line 3—3 in FIG. 1;

FIG. 4 is a sectional elevation view, drawn to an enlarged scale, taken approximately as indicated by line 4—4 in FIG. 1;

FIG. 5 is a detail elevation view taken approximately as indicated by line 5—5 in FIG. 4;

FIG. 6 is a detail view taken approximately as indicated by arrow 6 in FIG. 4;

FIG. 7 is a sectional elevation view similar to FIG. 4 but illustrating another embodiment of the invention;

FIG. 8 is a detail view taken approximately as indicated by line 8—8 in FIG. 7; and FIGS. 9 and 10 are detail views showing alternative apron mounting arrangements.

DESCRIPTION OF THE PREFERRED EMBODIMENTS

FIG. 1 illustrates an input station 20 for a conveyor belt 21 supported on a series of rollers 22. Coal, ore, sand, gravel, or other granular material 24 is discharged onto conveyor belt 21, at station 20, from a chute 25. In a given system, the discharge chute 25 could also comprise the discharge end of another conveyor. An elongated skirtboard 27 is mounted adjacent the near edge of conveyor belt 21, extending along the edge of the conveyor belt in the direction of belt movement, indicated by the arrow A. A similar skirtboard (not shown) may be located on the opposite side of belt 21. The lower edge 28 of skirtboard 27 is positioned a short distance above the surface of the belt to prevent frictional engagement between the skirtboard and the conveyor belt. Thus, there is a gap 29 between the upper surface of belt 21 and the lower edge 28 of skirtboard 27 as better shown in FIG. 2.

The input station 20 of the conveyor system shown in FIG. 1 includes two skirtboard apron assemblies 30A and 30B constructed in accordance with one preferred embodiment of the present invention. The skirtboard apron assemblies 30A and 30B are of corresponding construction, so that only one need be described in detail. Assembly 30A includes two brackets 32 mounted at spaced locations on skirtboard 27. As best shown in FIGS. 4–6, each bracket 32 includes a mounting base 33 that is welded or otherwise securely mounted on skirtboard 27. The outer portions of each of the brackets 32 are of U-shaped configuration, each bracket including a base wall 34 and two side walls 35 and 36. Each of the side walls 35 and 36 includes an elongated wedge-receiving aperture 37.

The skirtboard apron assembly 30A (FIG. 1) includes two tension arms 41, each mounted in one of the brackets 32. The mounting arrangement is better illustrated in FIGS. 4–6. As shown therein, each tension arm 41 includes an elongated wedge-receiving aperture 42. The wedge-receiving aperture 42 in each tension arm 41 is substantially longer than the wedge-receiving apertures 37 in the bracket side walls 35 and 36. A wedge 44 extends through the apertures 37 in the bracket side walls and through the aperture 42 in tension arm 41 to mount the tension arm in the bracket. Each wedge 44 is held in place by a retainer bolt 49 threaded through the central portion of its tension arm 41 into engagement with the wedge. Wedge 44 may be secured to a cable or chain 45 with the other end of chain 45 mounted on bracket 32 to prevent loss of the wedge.

A short channel 46 is welded or otherwise securely fastened to the bottom of each of the tension arms 41. an elongated apron-mounting channel member 47 is welded or otherwise securely affixed to the clamp 46 of each tension member. In the preferred construction shown in FIG. 1, the apron-mounting channel 47 extends for the full length of assembly 30A. As best shown in FIG. 4, the lower edge of each wall of channel 47, which is generally C-shaped in cross-sectional configuration, is bent inwardly and upwardly to provide a retainer lip 48 at each side of the channel.

A skirtboard apron 50 is incorporated in assembly 30A, extending downwardly from skirtboard 27 to close the gap 29 between the bottom edge 28 of the skirtboard and the upper surface of conveyor belt 21. Apron 50 comprises an elongated strip of rubber or other elastomer material; as best shown in FIGS. 4 and 5, two mounting elements 52 are secured to the opposite sides of the apron 50, adjacent its upper edge, by suitable means such as a series of rivets 53. In the construction shown in FIGS. 1–5, each of the mounting elements 52 is a metal strip, but other materials, preferably harder and stiffer than apron 50, can be employed. Mounting elements 52 can also be molded integrally with apron 50.

Apron 50 is mounted in assembly 30A by sliding the two mounting strips 52 into channel 47 as indicated by arrow B in FIG. 2, in the relationship illustrated more fully in FIGS. 4 and 5, so that the mounting elements 52 engage the retainer lips 48 of apron-mounting channel 47 to suspend the apron in a position in which it projects below the lower edge 28 of skirtboard 27 and closes gap 29.

In the preferred construction shown in FIGS. 4–6, skirtboard 27 is shown as being oriented at a slight angle to the vertical, converging somewhat toward the center of conveyor belt 21. More importantly, bracket 32 is mounted on the skirtboard so that apron 50 is inclined inwardly toward the center of conveyor belt 21 at an appreciable angle. Consequently, if the lower edge of apron 50 is in excessively close contact with the upper surface of belt 21, the resulting friction at the interface between the apron and the conveyor belt is relieved by upward flexure of the apron.

To replace apron 50 of assembly 30A on skirtboard 27, starting from the assembled condition illustrated in FIG. 1, conveyor 21 is first shut down. The two retainer bolts 49 are loosened, releasing them from engagement with the wedges 44 and the wedges are tapped out of the brackets 32 as shown in FIG. 2. Misplacement or loss of wedges 44 is prevented by the retainer chains 45. The subassembly comprising the two tension arms 41, channel 47, and apron 50 can now be removed from assembly 30A simply by lifting the two tension arms out of the brackets 32 to the position shown in FIG. 2. Apron 50 can then be readily removed by sliding the apron from channel 47 in either direction, following which a new apron is mounted in channel 47. With the new apron mounted in the subassembly, the two tension arms 41 are replaced in the receptacles afforded by brackets 32 and the wedges 44 are reinserted through the bracket side walls and the tension members to complete the mounting of the new apron on the skirtboard 27. In the mounting process, wedges 44 are tapped into brackets 32 to adjust the vertical alignment of apron 50 so that gap 29 will be closed as shown in FIG. 4.

To avoid a vertical gap between the ends of the two aprons in assemblies 30A and 30B (FIG. 1), it may be desirable to form the aprons 50 with angular mating end faces 55 as shown in FIG. 3. This does not interfere with removal and replacement of the apron, since it is readily possible to slide either apron a short distance in its support channel 47 to a position that will allow clearance in the course of apron removal and replacement. From the foregoing description, it will be apparent that removal and replacement of the apron in either assembly 30A or 30B can be accomplished in a very short period of time, so that shutdown of conveyor 21 is held to a minimum.

With continuing operation of conveyor 21, wear at the interface between the conveyor belt and apron 50 inevitably occurs. Most of the erosion occurs at the bottom edge of apron 50, which is preferably of a softer and more wearable material than belt 21. When appreciable erosion is encountered, it is a simple matter to adjust the vertical position of the apron simply by loosening the retainer bolts 49, tapping the wedges 44 further into the brackets 32 to move the apron 50 downwardly to a position at which it again closes the gap 29, and then tightening the retainer bolts 49. There is no need to shut down conveyor 21 for this adjustment operation.

Each of the skirtboard apron assemblies 30A and 30B (FIG. 1) comprises two brackets 32 supporting two tension arms 41, with the tension arms joined by one apron-mounting channel 47; this arrangement, though much preferred, is nevertheless subject to some modification. Thus, the channel 47 could be in two separate sections, one for each tension arm, instead of a single channel joining the two arms. The assembly might also be constructed to include three or more brackets and tension arms. These modifications present some difficulties in maintaining the advantages of the invention with respect to rapid and convenient apron replacement, but may be utilized in some instances.

FIGS. 7 and 8 illustrate another embodiment of the present invention. The construction shown in FIG. 7, a view similar to FIG. 4, includes a U-shaped bracket 62 having side walls 65 and 66 (FIG. 8). A bracket base 63 is affixed to the skirtboard 27 (FIG. 7). The lower end of bracket 62 is pivotally mounted upon base 63 by means of two set bolts 71 that are threaded into two lugs 72 which project outwardly from base 63. Bolts 71 may be tightened to engage the sides of a tension arm 81 to prevent the tension arm from dropping down if the belt 21 moves out of contact with the apron in this embodiment of the invention.

Two angle adjustment bolts 73 (only one shown, FIG. 7) are mounted on the upper portion of base 63 and extend outwardly of the base on opposite sides of bracket 62. Each bolt 73 extends through a lug 74 secured to one side wall of bracket 62. Two nuts 75 are threaded onto each bolt 73, one on each side of the associated bracket 74, permitting adjustment of the angle of bracket 62 relative to skirtboard 27. Bracket 62 is generally similar to bracket 32 with respect to the mounting of tension arm 81; the bracket side walls and the tension arm are provided with wedge-receiving apertures into which a wedge 44 is inserted to determine the vertical position of the tension arm. As before, a retaining bolt 49 is threaded into tension arm 81 and engages wedge 44.

The lower end of tension arm 81 is slotted to afford a firm mounting for an apron-mounting channel member 87 of C-shaped configuration. Channel 87, like channel 47 of the previously described embodiment, extends for approximately the full length of a resilient apron 90. A mounting element 92 of substantially T-shaped cross sectional configuration is affixed to apron 90 and fits into channel 87 in sliding relationship to suspend the apron from tension arm 81. As before, a much preferred construction would employ two brackets 62 mounted at spaced locations on skirtboard 27 with two tension arms 81 mounted in the brackets and joined by a single continuous apron-mounting channel 87.

The construction illustrated in FIG. 7 has the advantage that either edge of apron 90 can be utilized as a wear edge that closes the gap 29 between belt 21 and the lower edge 28 of skirtboard 27. That is, apron 90 can be removed from the position shown in FIG. 7, turned end-for-end, and reinserted into the assembly to afford a second wear edge. On the other hand, this construction has a slight disadvantage, as compared with the arrangement shown in FIG. 4, in that the mounting element 92 is more complex in configuration than the simple mounting strips 52 and consequently is somewhat more expensive to fabricate. The angular adjustment afforded by the construction in FIGS. 7 and 8 makes it possible to adapt the apron assembly to use with different skirtboards aligned at varying angles, while still assuring the avoidance of excessive friction at the apron-belt interface by allowing upward flexure of the apron. Of course, the apron-mounting channel arrangement of FIGS. 1-6, can be used with the angular adjustment feature of FIGS. 7 and 8.

FIG. 9 illustrates another modification that may be adopted for mounting the apron on the tension arms. In FIG. 9, the lower end of a tension arm 101 carries a retainer clip 106 that is welded or otherwise securely fastened to the tension arm. Clip 106, in turn, is welded or otherwise affixed to an elongated apron-mounting channel 107 of shallow C-shaped configuration. This embodiment includes an apron-mounting element 102, preferably comprising a metal extrusion, affording two downwardly extending legs 104 engaging opposite sides of an apron 100 and mounted on the apron by means of suitable fasteners such as a series of rivets 103. The top of the mounting member 102 includes two projecting mounting elements 105 that engage the inwardly bent retainer lips 108 of channel 107 to suspend apron 100 from tension arm 101. This construction has the advantage of a reduction in the unused portion of apron 100, but may be somewhat more expensive in fabrication than the construction shown in FIG. 4.

Another alternative arrangement for mounting the apron support channel on the tension arms is shown in FIG. 10. In this construction, a tension arm 111 is shown as having a retainer clip 116 welded or otherwise secured to the tension arm. Clip 116 in turn is welded or otherwise securely fastened to an elongated apron-mounting channel 117 of generally C-shaped configuration. The apron 110 employed in this embodiment has two metal mounting strips 112 secured thereto by suitable fasteners such as the rivet 113, but the mounting strips are secured to the center line of the apron instead of to one edge as in the arrangement of FIG. 4. In all other respects, the construction may be as described for FIGS. 1-6. The construction shown in FIG. 10 makes it possible to use both sides of apron 110, by reversing the mounting of the apron in its support channel 117, while retaining the simplicity and economy of the simple mounting elements afforded by strips 112.

From the foregoing description, it will be apparent that each of the various embodiments of the invention described above provides for convenient and effective adjustment of the apron position to compensate for wear without requiring shutdown of the conveyor, simply by tapping the wedges 44 into each of the apron brackets. Removal and replacement of the apron, when worn out, is rapid and convenient and requires only minimal shutdown of the conveyor in any instance. The preferred angular alignment of the conveyor minimizes adverse friction effects by permitting upward flexure of the apron. In all instances, the construction is quite simple and inexpensive and affords maximum life for the apron as well as the conveyor belt.

I claim:

1. A skirtboard apron assembly for a belt conveyor for granular material of the kind comprising a rigid skirtboard positioned a short distance above the conveyor belt and a resilient, replaceable apron mounted on and extending downwardly from the skirtboard to close the gap between the skirtboard and the belt, the apron assembly, in assembled condition, comprising:

a plurality of U-shaped brackets mounted at spaced positions along the skirtboard, each bracket having a base and two side walls defining a generally vertically oriented receptacle, the bracket side walls including aligned wedge-receiving apertures;

a corresponding plurality of tension arms, each positioned in one of the bracket receptacles and each including a wedge-receiving aperture aligned with the wedge-receiving apertures in the bracket sidewalls, each tension arm being affixed to a horizontally oriented apron-mounting channel extending parallel to the conveyor belt surface;

a corresponding plurality of wedges, each inserted through the wedge-receiving apertures in one mounting bracket and in one tension arm to mount that tension arm in the bracket;

and an apron having a longitudinally extending mounting element affixed thereto, the mounting element being slidably fitted into the channel of each tension member to suspend the apron from the tension member;

the vertical position of the apron being determined by the extent to which the wedges are inserted into the mounting brackets.

2. A belt conveyor skirtboard apron assembly according to claim 1 comprising two brackets and two tension arms, in which a single elongated apron-mounting channel is affixed to and extends between the two tension arms.

3. A belt conveyor skirtboard apron assembly according to claim 1 or claim 2, in which the brackets are mounted on the skirtboard at an angle such that the apron extends inwardly toward the center of the conveyor belt to allow for relief of excessive friction at the interface between the apron and the belt by upward flexure of the apron.

4. A belt conveyor skirtboard apron assembly according to claim 3, including means for adjusting the angular relation between the brackets and the skirtboard.

5. A belt conveyor skirtboard apron assembly according to claim 1 or claim 2, in which the apron-mounting channel is of C-shaped cross-sectional configuration with the channel edges bent inwardly to afford two retainer lips, and in which the apron has two mounting elements which engage the retainer lips of the channel to suspend the apron from the channel.

6. A belt conveyor skirtboard apron assembly according to claim 5 in which the mounting elements comprise two flat mounting strips of hard material secured to each other and to the apron by fasteners extending through both mounting strips and through the apron.

7. A belt conveyor skirtboard apron assembly according to claim 5 in which the two mounting elements are provided by a single elongated mounting strip affixed to the top edge of the apron and projecting outwardly of both sides of the apron.

8. A belt conveyor skirtboard assembly according to claim 5 in which the mounting elements are provided by a single T-shaped mounting member extending along one side of the apron.

* * * * *